(12) United States Patent
Karem

(10) Patent No.: US 8,490,920 B2
(45) Date of Patent: Jul. 23, 2013

(54) COMPOSITE BULKHEAD AND SKIN CONSTRUCTION

(76) Inventor: Abe Karem, Tustin, CA (US)

( * ) Notice: Subject to any disclaimer, the term of this patent is extended or adjusted under 35 U.S.C. 154(b) by 967 days.

(21) Appl. No.: 12/246,904

(22) Filed: Oct. 7, 2008

(65) Prior Publication Data

US 2009/0121081 A1  May 14, 2009

Related U.S. Application Data

(60) Provisional application No. 60/979,650, filed on Oct. 12, 2007.

(51) Int. Cl.
 *B64C 1/10* (2006.01)
 *B64C 1/06* (2006.01)
(52) U.S. Cl.
 USPC .......................................... 244/119; 244/131
(58) Field of Classification Search
 USPC .......................................... 244/119, 120, 131
 See application file for complete search history.

(56) References Cited

U.S. PATENT DOCUMENTS

| | | | |
|---|---|---|---|
| 5,062,589 A | 11/1991 | Roth et al. | |
| 5,324,563 A | 6/1994 | Rogers et al. | |
| 5,518,208 A * | 5/1996 | Roseburg | 244/132 |
| 5,562,264 A | 10/1996 | Bietenhader | |
| 5,681,010 A | 10/1997 | Jensen | |
| 5,934,616 A * | 8/1999 | Reimers et al. | 244/119 |
| 8,042,770 B2 * | 10/2011 | Martin et al. | 244/133 |
| 2003/0222371 A1 | 12/2003 | Edelmann et al. | |
| 2004/0035979 A1 | 2/2004 | McCosket, Jr. et al. | |
| 2004/0118977 A1 | 6/2004 | Anderson et al. | |
| 2005/0077427 A1 | 4/2005 | Brenner et al. | |
| 2007/0011970 A1 | 1/2007 | Hethcock et al. | |
| 2008/0258008 A1 * | 10/2008 | Cooper | 244/131 |
| 2009/0001217 A1 * | 1/2009 | Dufresne et al. | 244/119 |
| 2010/0065685 A1 * | 3/2010 | Basso | 244/119 |
| 2010/0148004 A1 * | 6/2010 | Beumler | 244/119 |

FOREIGN PATENT DOCUMENTS

| | | |
|---|---|---|
| DE | 3844080 A1 * | 12/1990 |
| EP | 0941922 | 9/1999 |

* cited by examiner

*Primary Examiner* — Joseph W Sanderson
(74) *Attorney, Agent, or Firm* — Fish & Associates, PC

(57) ABSTRACT

Aircraft fuselage structures have fuselage bulkheads in which the bulkhead outer caps are integrated with the skin, thereby reducing fastener count and weight. These outer caps and skin are preferably co-cured to form a strong structure. The outer caps can be advantageously constructed as continuous hoops of pultruded elements. The outer cap need not be interrupted by contours or cutouts for stringers, saving weight and reducing complexity. It is contemplated that by integrating the bulkhead outer caps into the skin, a bulkhead can still maintain equivalent stiffness and strength, while saving a significant number of rivets as compared to a comparable design without the outer cap.

15 Claims, 7 Drawing Sheets

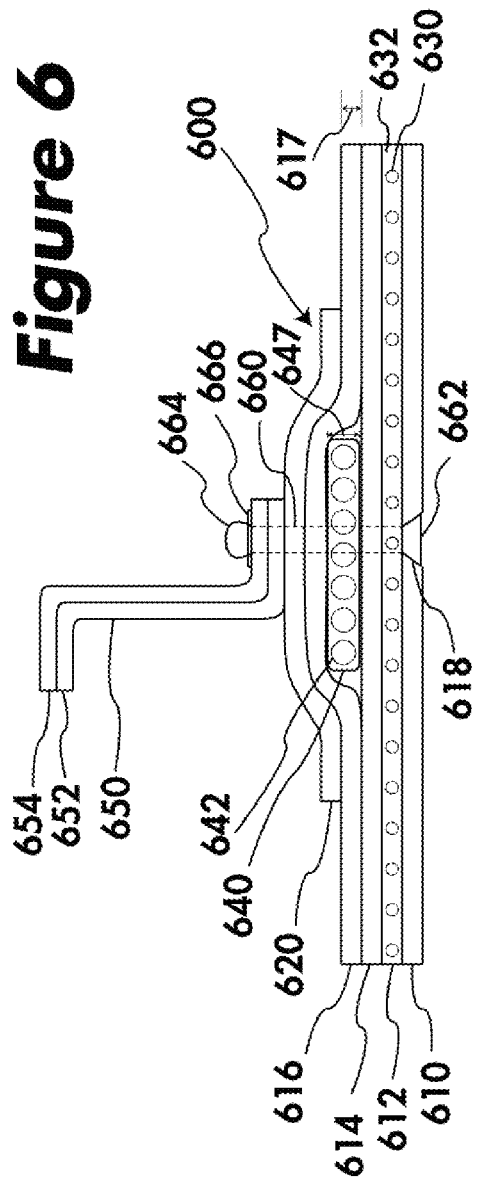

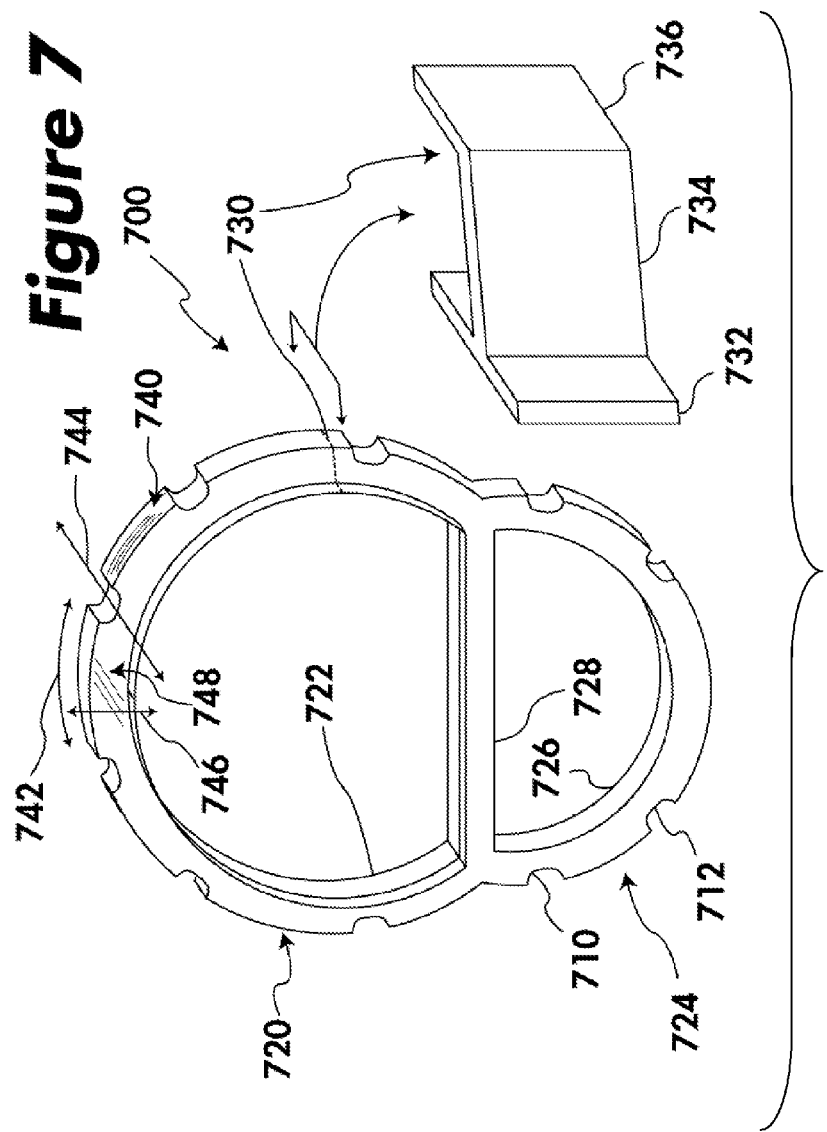

COMPOSITE BULKHEAD AND SKIN CONSTRUCTION

This application claims priority to U.S. Provisional Application Ser. No. 60/979650 filed Oct. 12, 2007 which is incorporated by reference herein in its entirety.

FIELD OF THE INVENTION

The field of the invention is the manufacture of composite structures.

BACKGROUND

The advantages of composite structures in aircraft construction are well known in the aerospace industry. Composites are increasingly used in the primary structure of new aircraft, both as an alternative to and adjunct to metal structures. Carbon fiber composites in which carbon fibers are embedded in an epoxy matrix offer relatively high stiffness and high strength while maintaining a low weight.

In one manner of producing large commercial transport aircraft the fuselage structure consists of a thin load bearing skin supported by lateral stringers to eliminate buckling and circumferential bulkheads to transfer shear and retain the fuselage shape. In metal aircraft construction, bulkheads are commonly joined to the skin by the use of rivets. In some large composite aircraft, including the prior art Boeing™ 787, these bulkheads are joined to the skin with an intermediary clip, necessitating the use of two rows of fasteners, the first between the clip and skin, and the second between the clip and bulkhead. While this method is effective at joining the bulkhead to the skin, it results in an excessive quantity of fasteners, and carries with it significant weight, complexity, and cost penalties.

Fuselage and wing skins in aircraft are commonly load bearing in both metal and composite construction. The skins provide a large surface area through which to dissipate shear and bending loads. This large thin structure is susceptible to buckling; therefore an internal support structure is required to adequately distribute loads to the skin and to prevent these skin panels from buckling. Major load carrying components such as wing mounts or landing gear are attached to internal frames which then distribute their concentrated loads out to the distributed skin panels. There are several prior art arrangements of the composite skin and supporting internal structure.

Relatively smaller composite aircraft such as the Raytheon™ Premier have used a load carrying skin structure which is supported against buckling by a lightweight honeycomb core. The use of a lightweight core material between skins is referred to as sandwich construction. FIG. 1 shows the nose fuselage section 100 of a Raytheon™ Premier. An outer skin layer 110 and an inner skin layer 120 surround a honeycomb core layer 130.

Larger composite aircraft such as the Boeing™ 787 have used the aforementioned skin and stringer configuration. In this configuration, stringers support the skin and major loads are transferred to the skin through the bulkheads spaced longitudinally through the aircraft. FIG. 2 depicts a Boeing™ 787 fuselage barrel section 200, comprising a skin 210 supported by regularly-spaced longitudinal stringers 220 and circumferential bulkheads 230. Fasteners 240 are used in attaching the bulkhead to the skin.

Other structural construction variations are also possible. In a hybrid configuration, bulkheads are used in combination with cored skin sandwich structure which is interrupted or tapered down at each bulkhead interface. In this configuration, the core prevents buckling of the skin and the bulkhead transfers concentrated loads to the skin.

Aircraft composite materials must often be cured to obtain the desired properties. Curing usually involves exposing the structure to combinations of one or all of elevated temperature, elevated pressure, or diminished pressure. A composite structure is considered "co-cured" when all the layers or components of the structure are cured together in a single curing stage, even if some of the layers or components were exposed to some type of curing before the step of co-curing. Co-curing can result in very strong bonds between parts and composite layers. In recognition of this, governmental civil aircraft certification agencies including the FAA currently approve of such co-cured structure without additional riveting between the skin and stringers.

Composite structures are often built of assemblies of co-cured parts. Such assembly uses secondary bonding. In compliance with current government certification practice, this secondary bonding between parts takes the form of rivets.

Recent composite aircraft fuselage or wing construction as found on the prior art Boeing™ 787 uses co-cured outer skin 210 and stringers 220 in the construction of a fuselage section 200, which avoids the need for a high number of rivets to attach the stringer 220 to the skin 210. The stringers 220 are co-cured with the skin 210 and continuous on either side of the bulkhead 230. As a consequence, the circumferential bulkheads 230 must be contoured around the stringers 210 by means of cutouts 232. These bulkheads 230 (or ribs in the case of wing construction) are numerous in a typical transport aircraft. The assembly of bulkheads 230 from multiple composite parts on the Boeing™ 787 requires secondary bonding and a large number of rivets 240 for each bulkhead 230. Each bulkhead 230 is riveted to a series of L-shaped clips around its circumference; each clip in turn is riveted to the skin. FIG. 3 shows another view of a prior art Boeing™ 787 fuselage section 300. Floor beams 310, which separate between the passenger section 320 and the cargo hold section 330, are built separately and attached to each bulkhead 340 using rivets 350 as secondary fasteners.

SUMMARY OF THE INVENTION

The present invention provides systems, apparatus, and methods by which the outer cap structural element of an aircraft fuselage bulkhead is integrated into the skin of the aircraft fuselage by layering the skin so as to substantially surround the outer cap, creating a thickened area of the skin, and thereby offering improved aircraft fuselage strength and stiffness and reduced aircraft fuselage weight.

It is contemplated that the outer cap of the fuselage bulkhead can be advantageously co-cured with the skin, and potentially fabricated using the same technique. The fuselage bulkhead is preferably coupled to the skin to serve as a structural support using secondary bonding, fasteners, or co-curing.

In preferred embodiments, the outer cap is not interrupted by cutouts or contours for stringers, saving weight and reducing complexity. Further, the outer cap can be constructed so as to form a continuous hoop about a cross-section of the fuselage providing increased strength.

The outer cap can be constructed to be sufficiently thick to serve as a pad-up, useful for locally increasing stiffness and creating a joint at which to couple composite parts together. Alternatively, it is contemplated that additional pad-up layers can be added to the skin further increasing stiffness. In especially preferred embodiments, the outer cap includes a pultrusion or other pultruded material integrated into the fuselage skin. It is contemplated that the outer cap could also comprise co-cured composite layers with fibers substantially in the hoop direction.

The fuselage bulkhead can be advantageously structured to have an inner cap substantially parallel to the outer cap. Further, the bulkhead cross-section for a passenger aircraft can be chosen to have upper and lower portions divided by a floor beam, with a floor beam integral with the bulkhead. The skin-integrated outer caps can also be applied selectively; some bulkheads without outer caps can be integrated into the design. By integrating the bulkhead outer cap into the skin, it is contemplated that a bulkhead might use no more than half of a typical number of rivets used in a comparable design without the outer cap and still maintain equivalent stiffness and strength.

BRIEF DESCRIPTION OF THE DRAWING

FIG. 6 shows a cross-section of a preferred skin construction showing an area of increased thickness and an integrated outer bulkhead cap.

FIG. 7 shows a preferred bulkhead frame along with a section cut.

DETAILED DESCRIPTION

The present invention provides systems, apparatus, and methods by which the outer structural cap material on a bulkhead is co-cured with and made part of the skin, using secondary bonding only once between the bulkhead frame and skin, and providing a continuous outer cap that is not interrupted by contours or cutouts for stringers. This reduces the number of fasteners used to secure the bulkhead to the skin, and creates a lower complexity, lower weight, higher strength bulkhead.

Figure 1:
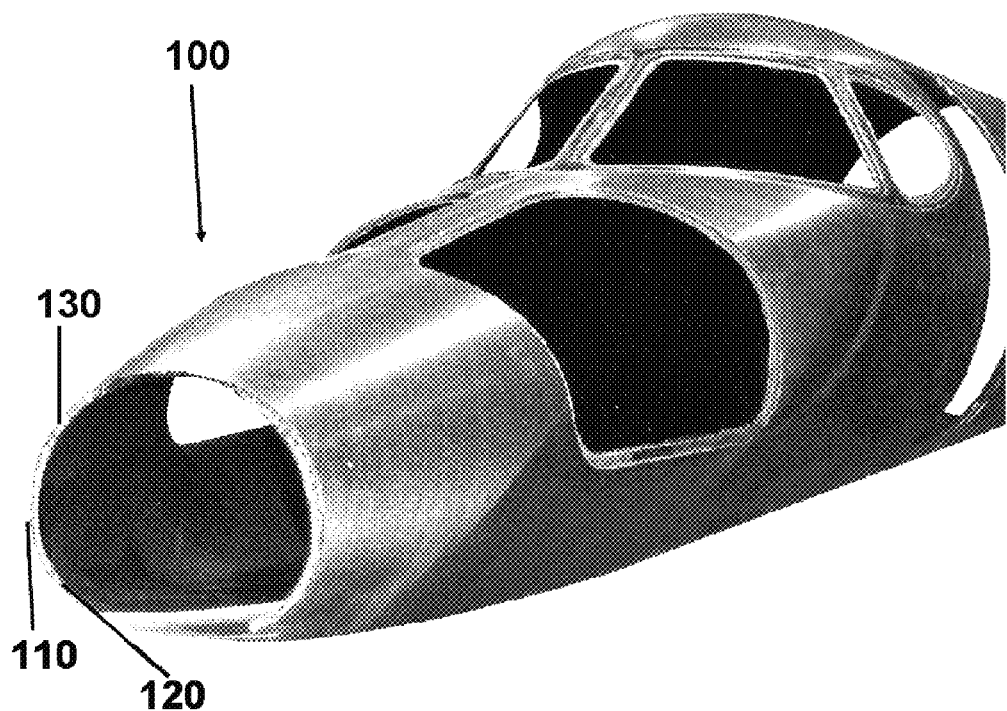
FIG. 1 is an illustration of the prior art Raytheon™ Premier composite sandwich fuselage construction.
Figure 2:
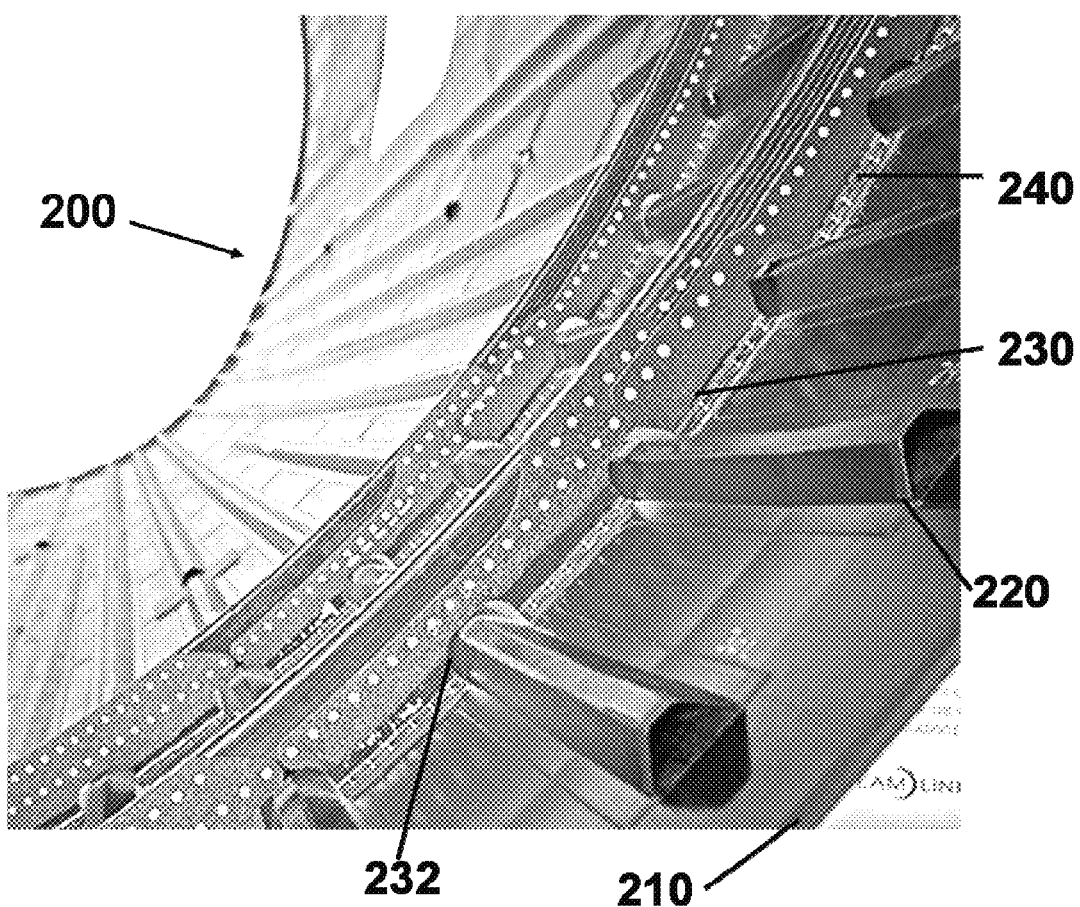
FIG. 2 is an illustration of the prior art Boeing™ 787 fuselage barrel section.
Figure 3:
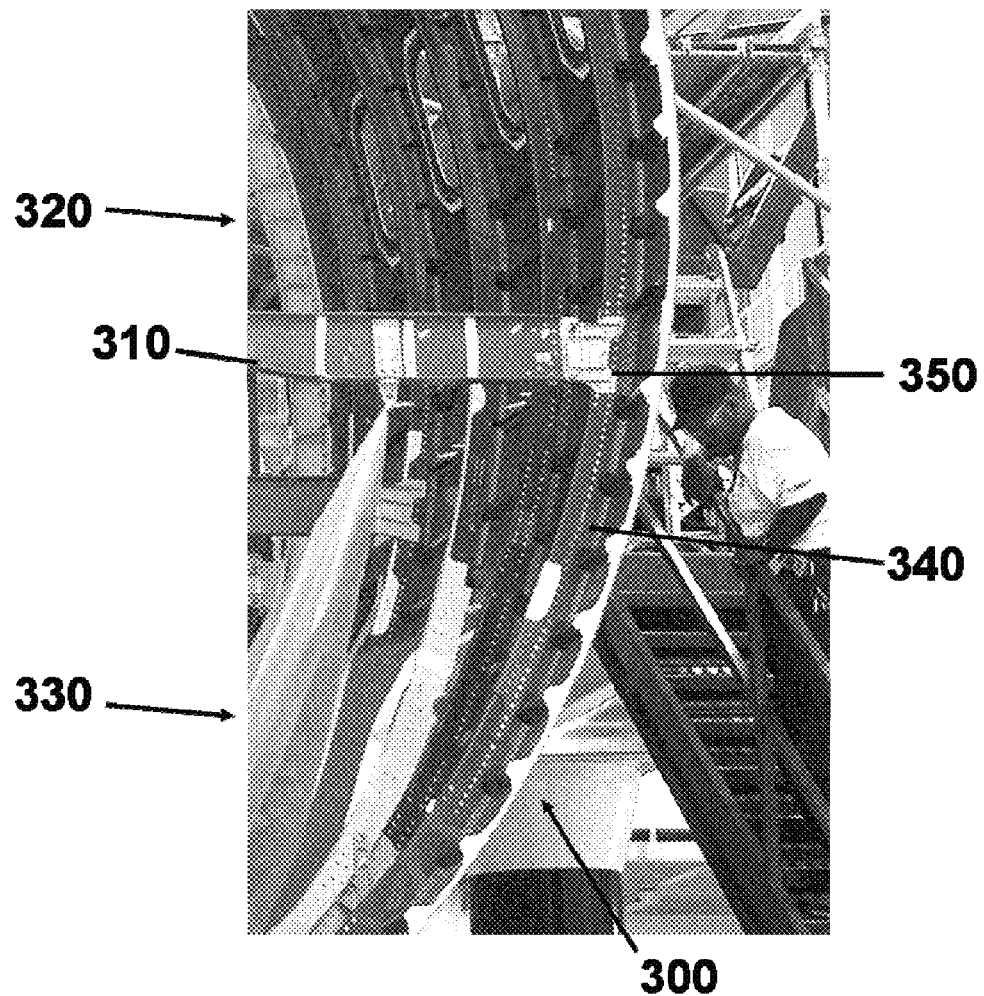
FIG. 3 is an illustration of the prior art Boeing™ 787 skin and stringer composite fuselage construction with a floor beam separating upper and lower portions.
Figure 4:
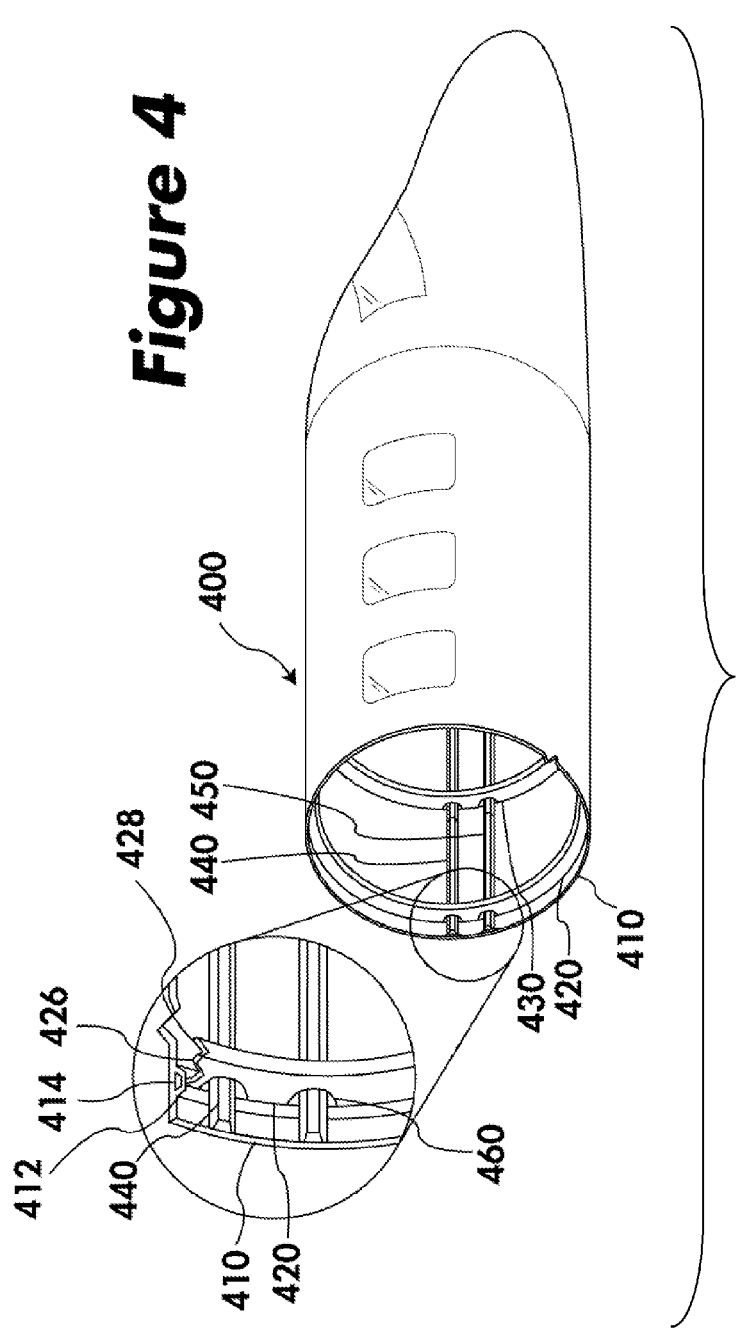
FIG. 4 is an illustration of a preferred composite fuselage construction with bulkhead outer caps integrated into the fuselage skin with an enlarged view of a portion.

The present invention has utility in aircraft fuselages and aircraft fuselage construction as shown in FIG. 4. A preferred aircraft fuselage 400 comprises a skin 410, a first bulkhead 420, a second bulkhead 430, and first and second stringers 440, 450. In especially preferred embodiments, the skin 410 has one or more thickened areas 412 advantageously surrounding an outer cap 414 section around at least a portion of the first bulkhead 420. Thus, in this example, a thickened area 412 of the skin 410 operates as an outer cap 414 of the bulkhead 420 because the thickened area 412 is coincident with, and is coupled to the bulkhead 420 to provide structural support. In this instance the thickened area 412 is also parallel with a largely lateral cross segment 428.

The first bulkhead 420 preferably includes a cutout 460 to allow the stringer 440 to continue from a near side of the bulkhead 420 to a far side of the bulkhead 420. The outer cap 414, however, has no cutouts for stringers. The bulkhead 420 can advantageously comprise largely radial web segments 426, largely lateral cross segments 428, and oblique segments. The second bulkhead 430 can optionally have an outer cap section integrated into the skin.

As used herein, "composite" means engineered materials made from two or more constituent materials. Of special relevance are carbon composites, in which carbon fiber is embedded in a matrix or resin, especially epoxy matrices, thermosetting or thermoplastic resins. Alternate composites are also contemplated including those containing fiberglass, ceramics, and other elements.

Figure 5:
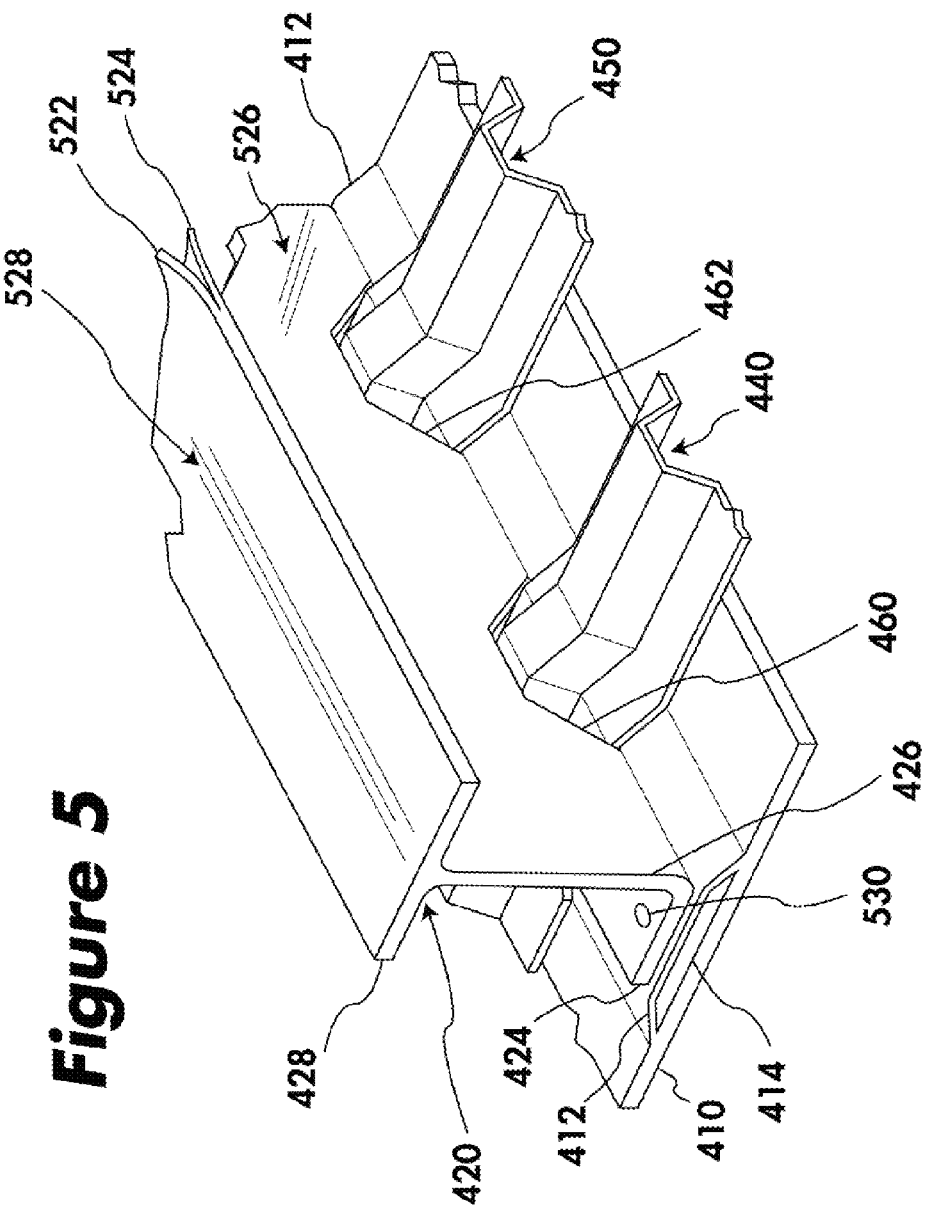
FIG. 5 is a detail of a preferred composite fuselage construction.

In FIG. 5, an enlarged portion of an especially preferred fuselage construction is shown. A bulkhead 420 comprises a performed frame with a base segment 424 a largely radial web segment 426 and an upper cross segment 428 in the shape of the letter "J". The upper cross segment 428 comprises a first layer 522 and second layer 524 of composite material. The first layer 522 comprises a series of largely unidirectional fibers 528 embedded in a resin material. The radial segment 426 is made of a laminated composite material and has layers with fibers 526 arranged in oblique orientations. The aircraft skin 410 has an area of increased thickness 412, which allows sufficient thickness and strength for rivets 530 and smooth transfer of loads from the bulkhead 420 to the skin 410 and the fuselage 400. Additional material comprising an outer cap 414 is advantageously embedded in the area of increased thickness 412. This outer cap 414 is attached to the bulkhead 420 by means of rivets 530 and functions as a bulkhead cap, increasing the bulkhead bending stiffness. The bulkhead web segment 426 is contoured around optional stringers 440, 450 by means of cutouts 460, 462. Thus, FIG. 5 provides another example in which a thickened area 412 of the skin 410 operates as an outer cap 414 of the bulkhead 420.

Prior art fuselage constructions have used two sets of fasteners to couple a bulkhead to the skin, one set used to couple an outer cap to a bulkhead frame, and a second set used to couple the bulkhead outer cap to the skin. The present teachings provide for only a single set of fasteners to be used in coupling a bulkhead to the skin, because the cap and skin are integrated and co-cured. This results in a significant reduction in the fastener count or rivet count. Realistically, the reduction in fastener or rivet count contemplated to fall within the 30-50% range.

As used herein, a "laminated" object refers to an object made with laminates, and typically comprises multiple layers or plies of composite with fibers in a resin. Individual layers or plies preferably have a plurality or fibers arranged in a predominantly similar orientation. Different layers in a laminate can have fibers at different angles. However, in some cases, a laminate can comprise only a single layer of material.

As used herein, a "pultrusion" or "pultruded material" refers to a pultruded composite. Pultruded composites are typically pieces of composite material with largely constant cross-section formed by pulling fibers through a resin in a die, possibly followed by some form of curing. Because the fibers in a pultrusions are usually pulled through a resin and die, pultrusions often have relatively high compressive strength. After the pultrusion process, subsequent processing or milling can change the cross-section.

FIG. 6 depicts a cross section of another preferred bulkhead and laminated composite fuselage skin 600 construction, in which a thickened area of the skin operates as an outer cap of the bulkhead. In preferred embodiments, an outer composite skin layer 610 is accompanied by additional skin layers 612, 614 with differing fiber orientations. The second skin layer 612 is shown with fibers 630 embedded in a matrix 632. The fibers 630 in this skin layer 612 are unidirectional and aligned in the hoop direction.

A pultruded outer cap 640 is placed over the outer skin layers 610, 612, 614. An additional skin layer 616 is advantageously placed on the other side of the pultruded outer cap 640 to surround the outer cap 640 and make it integral with the skin 600. The pultruded outer cap features largely unidirectional fibers 642 in the hoop direction. It is contemplated that multiple pultrusions or pieces of pultrusions might be incorporated between skin layers 614, 616. A skin pad-up layer 620 is placed medially (as opposed to laterally or externally) relative to the inner skin layer 616 to locally increase the thickness, strength, and stiffness of the laminated composite skin 600 in the vicinity of a bulkhead 650 and rivets 660. Thus, the skin 600 has an area of increased thickness brought about by the inclusion of a pultruded outer cap 640 and/or skin pad-up layers 620. Even a single layer, e.g., 0.005 inches thick, can serve as a pad-up layer. But preferably the pad-up comprises at least first, second and third pad-up layers, each having a thickness of at least 0.01 inches. These pad-up layers would usually be added to the skin during a manufacturing process. The term "added to the skin" means that the pad-up layers are bonded and/or co-cured to/with the skin during the manufacturing process. Contemplated manufacturing processes in this instance include hand lay-up and automated fiber placement.

The bulkhead 650 is also of laminated composite construction, with first and second layers 652, 654 having suitable fiber orientations. The bulkhead 650 is shown in the shape of the letter Z, but is contemplated to be of any suitable cross section, including those resembling the letters J, Z, I, and C. While it is contemplated that the bulkhead 650 could be co-cured with the skin 600, FIG. 6 depicts secondary bonding in the form of rivets 660 between the bulkhead 650 and laminated composite skin 600. A rivet 650 has a head 662 that is driven into a countersunk hole 618 in the outer skin layer 610 or layers. The rivet 660 has a tail 664 that sits on a titanium support 666 to prevent delamination. The rivet 660 extends through the skin layers 610, 612, 614, 616, 620 and outer cap 640.

All suitable layers and layer thicknesses are contemplated for constructing the skin 600 and bulkhead 650. A skin layer 616 has a thickness 617 that might realistically be 0.005, 0.01, or even 0.05 inches. The skin 600 might realistically comprise 1, 3, 5, 10, 30, 50, 70, 100, or even 150 layers. It is contemplated that the outer cap 640 can be constructed of one or more pultruded sections or unidirectional laminate pieces stacked side-by-side or on top of each other. The outer cap 640 has a total thickness 647 that might be 0.005, 0.01, 0.05, 0.1, 0.25, 0.5, or even 1.0 inches, which total thickness provides the additional "thickened area", as for example discussed with respect to FIGS. 4-6. The skin 600 and the integrated outer cap 640 are co-cured by any suitable process. Contemplated layers can have any suitable thicknesses can drop to zero outer cap thickness if supporting structures permit. Pultruded strips likewise can be of any workable width and thickness combination. Unless the context dictates the contrary, all ranges set forth herein should be interpreted as being inclusive of their endpoints, and open-ended ranges should be interpreted to include only commercially practical values.

It is further contemplated that the skin can have a sandwich construction in some areas. As used herein, "sandwich" construction means a lower density and relatively thicker core between two higher-density skin layers. Preferred sandwich constructions include laminated carbon composite skin layers and honeycomb or foam core.

In areas where the skin thickness is at the minimum acceptable gauge, including the outboard sections on a wing or the nose and tail of a fuselage, the cap can serve as a pad-up. In areas of heavy gauge skin thickness, such as at the center of the fuselage, there may not be a need for a padup or cap, as sufficient riveting and load transfer material exists in the skin. The outer cap material can be laminated as part of the layup of the fuselage skin using the same manufacturing process, including fiber placement.

In especially preferred configurations the inner cap material is a unidirectional pultruded strip which can be tailored to the correct width and thickness allowing for rapid lay-up of the cap material and increased strength of the cap, especially compressive strength.

In FIG. 7, a preferred complete bulkhead frame 700 is shown having an upper portion 720 and a lower portion 724, in a "double bubble" configuration. Contoured areas consisting of cutouts 710, 712 are provided to allow stringers to pass through without interruption. A cross-section 730 of the bulkhead frame 700 is shown with a radial web segment, a lateral cross segment 732 that functions as an inner cap 722, 726, and a base segment 736 that allows for attachment to the fuselage skin. Fibers 740 in a layer of the lateral cross segment 732 of the upper portion 720 of the bulkhead frame 700 can advantageously be aligned in the hoop direction 742 or at some angle between the longitudinal direction 744 and the hoop direction 742. Fibers 748 in the radial web segment 734 can be aligned obliquely at an angle between the radial direction 746 and the hoop direction 742. The upper portion 720 and lower portion 740 are separated by a floor beam 728. In a typical passenger aircraft construction, passengers would be seated in the part of the fuselage defined by the upper portion 720 and cargo would be placed in the part defined by the lower portion 724, with the floor beam 728 defining the passenger compartment floor.

In preferred embodiments, the bulkhead 700 has upper and lower portions 720, 724, divided by a floor beam 728, and the floor beam 728 is integral with the bulkhead 700. As used herein, the term "integral with" means that the integral elements are co-cured.

All suitable fuselage cross-section shapes are contemplated including circular, oval, and other shapes. The upper inner cap 722 and lower inner cap 726 are continuous hoops and are uninterrupted by stringers or cutouts. It may be seen that the upper inner cap 722 and lower inner cap 726 are substantially parallel to the outer cap (not shown) which runs around the circumference of the bulkhead frame 700, preferably in a continuous hoop. In less preferred embodiments the outer and/or inner caps could be interrupted or discontinuous in some manner.

It is contemplated that the outer cap of the bulkhead frame 700 can advantageously be integrated into the skin and co-cured as previously described. It is further contemplated that the outer cap that is integrated with the skin can be a continuous and uninterrupted hoop.

In preferred embodiments, the outer cap of the bulkhead, primarily of unidirectional material is layed-up and co-cured with the skin of the aircraft. The inner cap consists of one or two continuous loops of unidirectional material for the upper passenger cabin and cargo bay respectively. This produces a bulkhead with integral floor beam structure which has an uninterrupted inner cap.

The previously described systems, apparatus, and methods have application beyond aircraft fuselage construction. For example, in wing construction, an outer cap for a wing rib can be integrated into the wing skin structure. All suitable fibers and matrices are contemplated, including all suitable fiber arrangements and orientations.

Thus, specific embodiments and methods for producing a reduced fastener count, lighter and less expensive bulkhead and skin construction have been disclosed.

It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An aircraft fuselage having a bulkhead coupled to a composite fuselage skin, the improvement comprising:
   the bulkhead having a base segment coupled to an upper cross segment via a substantially radial web segment;
   the base segment substantially parallel to the upper cross segment, and having cutouts for stringers; and
   a thickened area of the skin operating as an outer cap of the bulkhead, and riveted to the base segment,
   wherein the stringers conform to the shape of the thickened area.

2. The aircraft fuselage of claim 1, wherein the outer cap is sufficiently thick to serve as a pad-up.

3. The aircraft fuselage of claim 1, wherein first and second pad-up layers are added to the skin during a manufacturing process.

4. The aircraft fuselage of claim 1, wherein the outer cap includes pultruded material.

5. The aircraft fuselage of claim 1, further comprising a second bulkhead that does not have an outer cap.

6. The aircraft fuselage of claim 1, wherein the outer cap forms a continuous hoop about a cross-section of the fuselage.

7. The aircraft fuselage of claim 1, wherein the bulkhead has upper and lower portions divided by a floor beam, and the floor beam is integral with the bulkhead.

8. The aircraft fuselage of claim 1, wherein the bulkhead has an inner cap substantially parallel to the outer cap.

9. The aircraft of claim 1, wherein the outer cap includes fibers in a hoop direction.

10. The aircraft of claim 1, wherein the outer cap includes fibers that are co-cured with fibers of the skin.

11. The aircraft of claim 1, wherein the composite skin comprises carbon fibers, and the fuselage in the region of the thickened area of the skin is of constant cross-section.

12. The aircraft of claim 1, wherein the bulkhead has an inner ring defining an open space.

13. The aircraft of claim 1, wherein the composite skin comprises carbon fibers.

14. The aircraft of claim 1, wherein the upper cross segment has fibers running parallel to a long axis of the bulkhead.

15. The aircraft of claim 14, wherein the web has fibers running oblique to the long axis of the bulkhead.

\* \* \* \* \*